United States Patent
Bliss et al.

(10) Patent No.: US 7,441,436 B2
(45) Date of Patent: Oct. 28, 2008

(54) METHOD FOR WEIGHING APPARATUS CALIBRATION MANAGEMENT

(75) Inventors: Doug Bliss, Worthington, OH (US); John Moorman, Powell, OH (US); Venus Simmons, Delaware, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 105 days.

(21) Appl. No.: 11/374,673

(22) Filed: Mar. 14, 2006

(65) Prior Publication Data

US 2007/0073505 A1 Mar. 29, 2007

Related U.S. Application Data

(60) Provisional application No. 60/720,729, filed on Sep. 27, 2005.

(51) Int. Cl.
*G01G 23/01* (2006.01)

(52) U.S. Cl. .................... 73/1.13; 177/50; 702/101

(58) Field of Classification Search .................. 73/1.13; 702/101; 177/25.13, 50
See application file for complete search history.

(56) References Cited

U.S. PATENT DOCUMENTS

| | | | | |
|---|---|---|---|---|
| 3,820,428 | A * | 6/1974 | Marshall | 83/38 |
| 3,916,173 | A * | 10/1975 | Williams et al. | 702/101 |
| 4,511,010 | A * | 4/1985 | Sashiki et al. | 177/50 X |
| 4,512,430 | A * | 4/1985 | Bowersox et al. | 177/25.13 X |
| 4,660,663 | A | 4/1987 | Amacher et al. | |
| 4,760,539 | A | 7/1988 | Amacher et al. | |
| 4,858,161 | A * | 8/1989 | Baumann | 702/101 |
| 4,909,338 | A | 3/1990 | Vitunic et al. | |
| 5,056,050 | A * | 10/1991 | Fuchs et al. | 702/101 |
| 5,058,422 | A * | 10/1991 | Shimauchi | 73/1.13 |
| 5,159,959 | A * | 11/1992 | Bohm | 177/50 X |
| 5,606,516 | A * | 2/1997 | Douglas et al. | 73/1.13 X |
| 5,619,186 | A * | 4/1997 | Schmidt et al. | 340/573.1 |
| 5,640,334 | A | 6/1997 | Freeman et al. | |
| 5,780,782 | A | 7/1998 | O'Dea | |
| 5,823,278 | A * | 10/1998 | Geringer | 177/144 |
| 6,576,849 | B2 | 6/2003 | Bliss et al. | |
| 6,609,054 | B2 * | 8/2003 | Wallace | 701/45 |
| 6,759,604 | B2 * | 7/2004 | Ishida et al. | 73/1.13 X |
| 7,385,520 | B2 * | 6/2008 | Patterson et al. | 340/667 |

FOREIGN PATENT DOCUMENTS

EP 282225 A * 9/1988

(Continued)

OTHER PUBLICATIONS

Excerpts from manual for Jagxtreme offered for sale at least one year before priority date, 11 pages, i.e. by Sep. 2004.

(Continued)

*Primary Examiner*—Thomas P Noland
(74) *Attorney, Agent, or Firm*—Standley Law Group LLP

(57) ABSTRACT

A weighing apparatus calibration method uses a test mass, a material and a terminal to calculate and compare the total weight of the test mass and material to determine if the total capacity of the weighing apparatus has been calibrated. A system for managing calibration of a weighing apparatus is also described.

9 Claims, 5 Drawing Sheets

FOREIGN PATENT DOCUMENTS

| | | | | |
|---|---|---|---|---|
| GB | 2291998 | A | * | 2/1996 |
| JP | 61175527 | A | * | 8/1986 |
| JP | 01282431 | A | * | 11/1989 |
| JP | 02187141 | A | * | 7/1990 |

OTHER PUBLICATIONS

Fairbanks Scales Inc., Operator's Manual, "FB 3000 Series Instrument with Intalogix Technology, Models: FB 3000", Issue 1, May 2005, 47 pages.

* cited by examiner

METHOD FOR WEIGHING APPARATUS CALIBRATION MANAGEMENT

This application claims the priority benefit of U.S. Provisional Patent Application No. 60/720,729, filed Sep. 27, 2005, which is hereby incorporated by reference in its entirety.

BACKGROUND AND SUMMARY OF THE INVENTION

The present invention is directed to weighing apparatus calibration and more specifically to a method for managing the calibration of weighing apparatus.

Installations such as scales, weigh platforms, vessels (such as silos, tanks and hoppers) or other weighing apparatus are used in many processes for information and process control purposes. These installations usually have a working configuration of at least one load cell. The load is usually transmitted to the working load cell through a support bracket or other special bearing surface, adapted to carry its weight and the weight of any contents. Typically, three or four working load cells, with corresponding supports, are used in any one installation, so the aggregate load is the sum of all the separately measured loads. Some weighing apparatus may use a mechanical arm system to transfer their weight to a single load cell. Additional details of the functions of load cells can be found in U.S. Pat. No. 6,576,849, which is hereby incorporated by reference.

Such installations may need to be calibrated from time to time. This may be because of drift or creep in the electrical or mechanical properties of the load cells, in the tare of the weigh platform or vessel, or after a repair. It may not be practicable to remove the load cell or cells from the installation for re-calibration because of the substantial impact this will have on the availability of the installation. In an industrial process, it may mean production downtime. Instead, different methods have been adopted. One such method includes placing a known test mass equaling the total weighing capacity of the installation on the weighing apparatus. The system compares the known test mass with the total weight indicated by the working load cells. The technician or terminal then calibrates the system to that known test mass. The indicated total weight is conventionally the single integrated or summated output of all load cells combined. Conventional weighing calibration takes the whole system into consideration, including all load cells, sources and measures of applied excitation voltage to the load cells, and meters for interpreting the corresponding load cell output signals. A necessary consequence is that, if any part of this system fails or is adjusted or replaced; the whole system must be recalibrated.

When sufficient test masses are not available to perform the calibration function, a process known as step or substitution calibration may be used. In this technique, a technician places a known test mass, which is less than the total weighing capacity of the installation, on the weighing apparatus and calibrates the weighing apparatus to that load point. The technician removes the test mass and adds a substitute material to bring the indicated weight substantially close to the test mass' weight. The technician places the test mass back on the weighing apparatus. Next, the technician calculates the total weight of the test mass and the material and inputs the amount into the terminal. The technician re-calibrates to the new total load point. The process is repeated until the total load calibrated is close to the total weighing capacity of the weighing apparatus. This process is cumbersome and requires manual data entry at each of the various steps during the calibration. Additionally, the technician performing the calibration must calculate the indicated weight and the known test mass either with the aid of a calculator or in his or her head creating the possibility of errors.

Exemplary embodiments of the present invention may automate and manage the calibration process. A calibration management system monitors the weighing apparatus to determine if a limit is exceeded. If the limit is exceeded, the system instructs a technician, through a series of prompts, to run a calibration test. If the test is performed successfully, the calibration manager is reset. If the test is not successful then an event may occur. The event may be: displaying a message on the terminal's screen; sending a message by email, instant message or fax to a predetermined location, deactivating the weighing apparatus and/or any combination thereof. Additionally, an action may be performed, such as a repair or re-calibration of the system. During calibration of the system, increments of weight are added to the weighing apparatus based on prompts initiated by the terminal and followed by the technician. This is opposite of the known approach. In exemplary embodiments of the present invention, the terminal instructs the technician and not vice versa.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
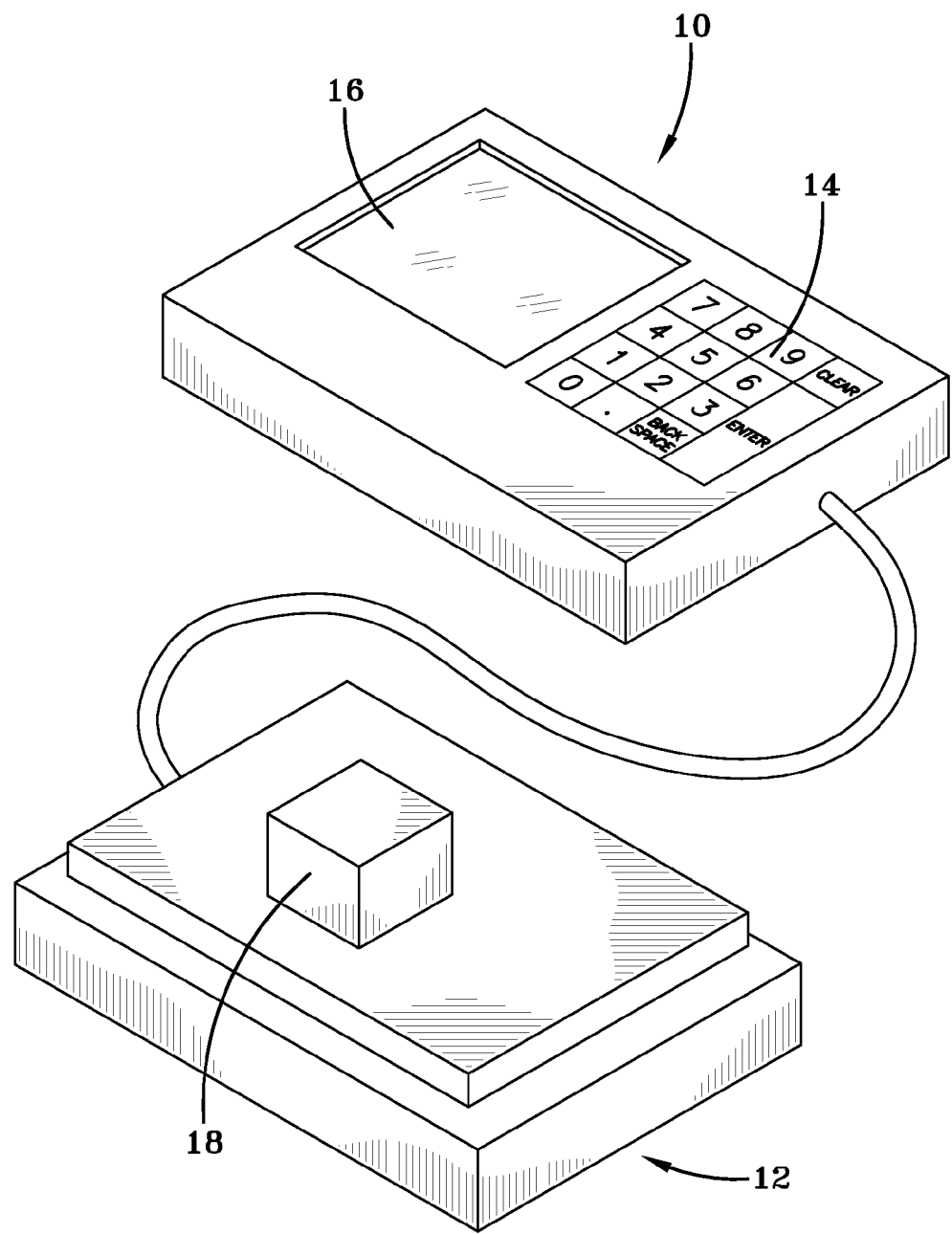
FIG. 1 shows a perspective view of one embodiment of the present invention.

In one embodiment, as shown in FIG. 1, a terminal 10 may be electronically connected to a weighing apparatus 12. The terminal 10 may be connected to any weighing apparatus known in the art, such as those available from Mettler-Toledo, Inc. of Columbus, Ohio. The terminal 10 may include a keyboard 14 for entering information into the terminal 10. The terminal 10 may also include a display 16 for displaying instructions or other information and/or a memory storage device for storing the information. The display may be any display known to one of ordinary skill in the art. Exemplary displays may be a liquid crystal display (LCD) or VF display such as those available from Sharp Electronics Corporation of Mahwah, N.J. and Noritake Itron Corporation of Japan. The terminal 10 may also contain software which may perform the methods described in more detail below.

Figure 2:
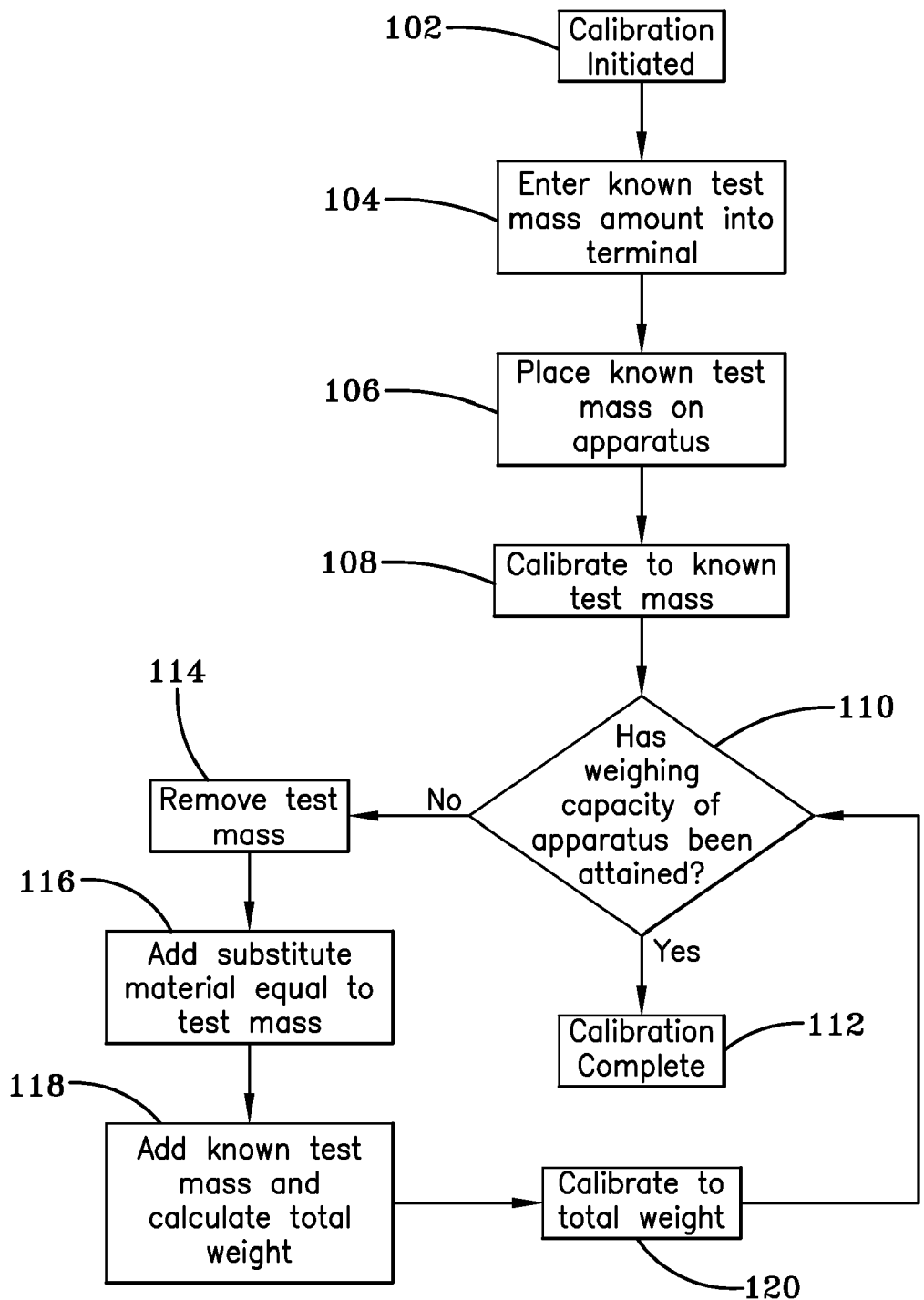
FIG. 2 shows a flow diagram of a calibration module of the present invention.

FIG. 2 shows a calibration method of one embodiment of the present invention. First, a technician may initiate the calibration method at the terminal 10 in step 102. The terminal 10 may guide the technician through a series of steps to calibrate the weighing apparatus 12. Any known calibration method may be implemented with the exemplary embodiments of the present invention. As an exemplary embodiment, the step or substitution calibration method is discussed below.

The terminal 10 may prompt the technician to enter the weight of a test mass 18 to be used for the calibration. Any known test mass may be used such as those available from Henry Troemner LLC of Thorofare, N.J. The technician may enter the amount using the keyboard 14 on the terminal 10 in step 104. Next, the terminal 10 may prompt the technician to place the test mass 18 on the weighing apparatus 12 in step 106. The terminal 10 may continuously display the live weight reading on the display 16 with each of the prompts to aid the technician with the calibration. The terminal 10 may calibrate the weighing apparatus 12 to the weight of the test mass 18 in step 108. At decision point 110, the terminal 10 may check whether or not the weighing capacity of the weighing apparatus 12 has been attained or may prompt the technician on whether or not to continue. If the weighing capacity has been attained or the technician wishes not to continue then the calibration may be complete at step 112. If the weighing capacity has not been attained and/or the technician wishes to continue then the terminal 10 may prompt the technician to remove the test mass 18 at step 114.

Next, the terminal 10 may prompt the technician to add material to the weighing apparatus 12 in an amount equal to the weight of the test mass 18 at step 116. The material may be any liquid or granular material such as but not limited to water or sand. The technician may observe the live weight displayed on the display 16 of terminal 10 to aid in achieving the appropriate substituted weight. Once the material has been added the terminal 10 may prompt the technician to place the test mass 18 back onto the weighing apparatus 12. In one embodiment, the technician may press a button on the keyboard 14 of the terminal 10 to alert the terminal 10 that the test mass 18 has been placed back on the weighing apparatus 12. The terminal 10 may calculate the total weight of the test mass 18 and the material added to the weighing apparatus 12 at step 118. The terminal 10 may calibrate the weighing apparatus 12 to the new calculated total weight of both the material and the test mass 18 at step 120. Steps 110-120 may be repeated until the weighing capacity of the weighing apparatus 12 is substantially attained or the technician wishes to stop the calibration.

Figure 3:
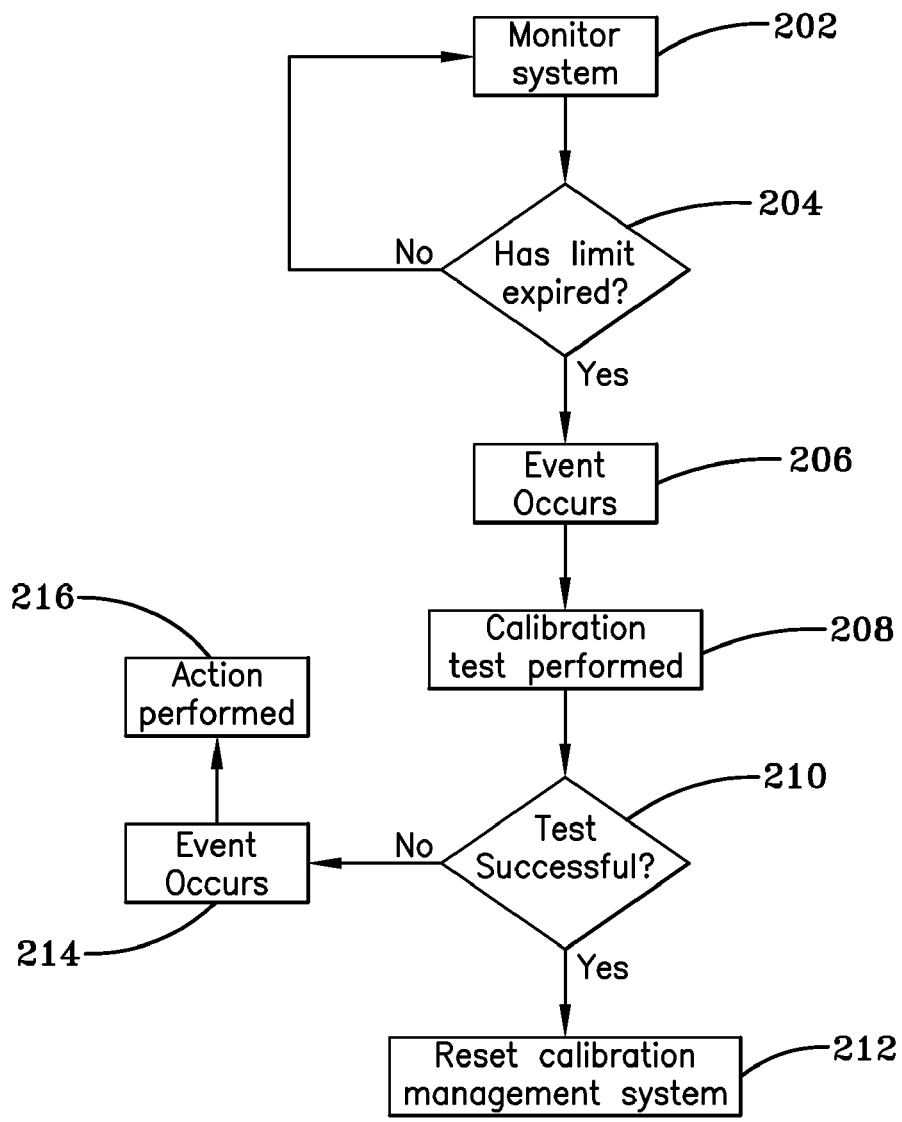
FIG. 3 shows a flow diagram of a calibration management module of the present invention.

A calibration management module of one embodiment of the present invention is shown in FIG. 3. At step 202, the terminal 10 may monitor the use of the weighing apparatus 12 and may check either periodically or in real time whether or not a time limit, weighment limit, overload limit, zero request limit or any other predetermined limit has been exceeded at decision point 204. A weighment may be achieved when enough weight is placed on the weighing apparatus 12 to pass a predetermined threshold. Once the limit has been exceeded, an event may occur at step 206. The event may be: displaying a message on the terminal's display 16; sending a message by email, instant message or fax to a predetermined location, deactivating the weighing apparatus 12 and/or any combination thereof.

Once the event occurs, a calibration test module may perform a calibration test at step 208. The calibration test is described in more detail below. At decision point 210, if the test is performed successfully, the calibration management module may be reset and monitoring continues at step 212. If the test is not performed successfully another event may occur at step 214. Again, the event may be: displaying a message on the terminal's display 16; sending a message by email, instant message or fax to a predetermined location, deactivating the weighing apparatus 12 and/or any combination thereof. Once the second event occurs, an action may be performed.

Exemplary actions may be: performing maintenance on the weighing apparatus 12, running the calibration test over again, and/or re-calibrating the weighing apparatus 12. Maintenance actions may include but are not limited to: replacement of one or more defective load cells, junction boxes, wires or instruments, adjustment of mechanical linkages, zeroing the scale, cleaning of foreign material from bearing surfaces, and/or removal of associated apparatus that are rubbing on live load surfaces. If the weighing apparatus 12 is repaired, the system may log the maintenance event in a maintenance log, calibrate the weighing apparatus 12 as shown in FIG. 1 and/or run the calibration test as discussed below.

Figure 4:
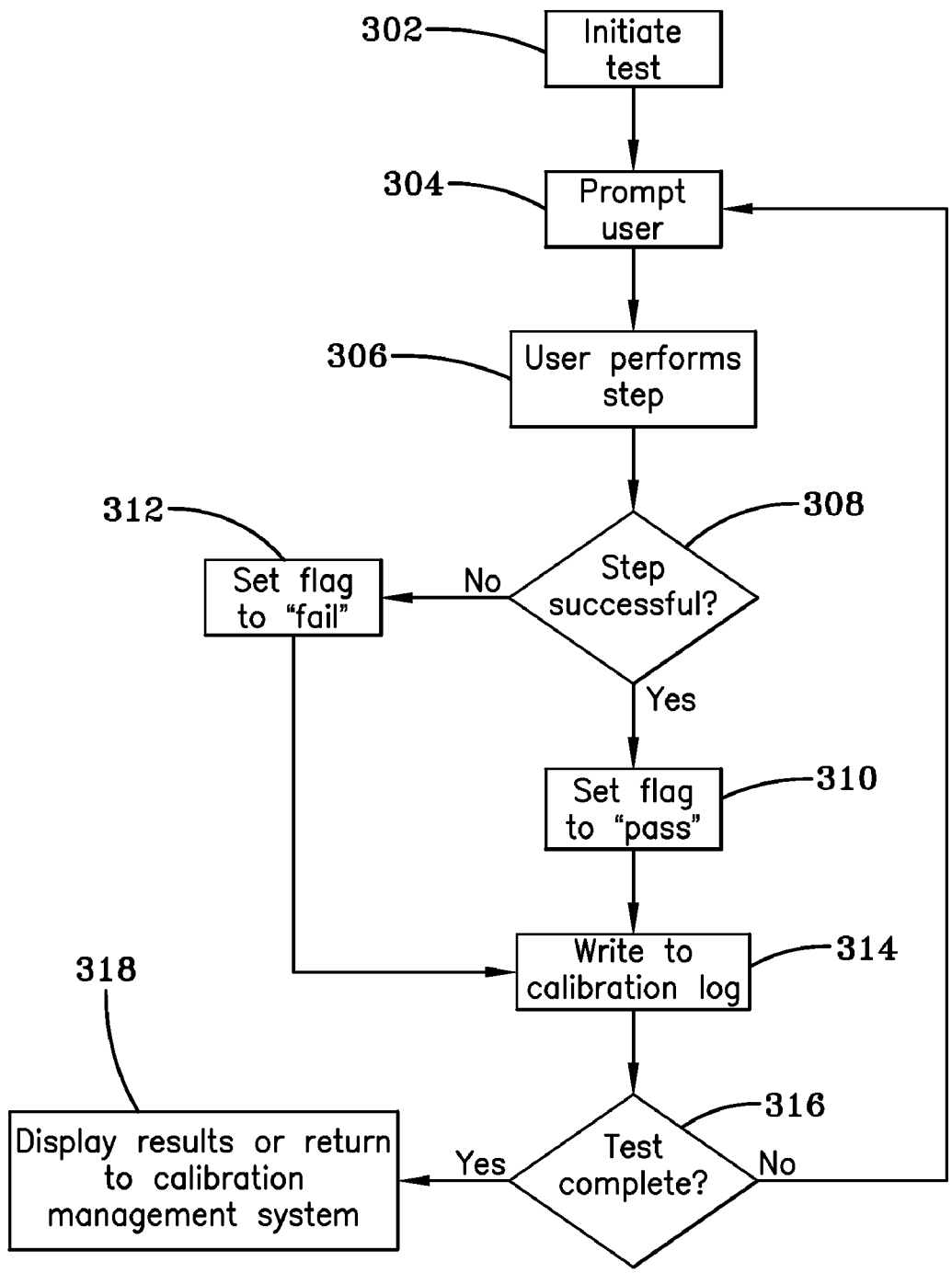
FIG. 4 shows a flow diagram of a calibration test module of the present invention.

The calibration test is described in FIG. 4. First, a source may initiate the test at step 302. The source may be a technician, a remote device or the calibration management module of the terminal 10. Next, the terminal 10 may prompt the technician with an action at step 304 and the technician may perform the action at step 306. If the action was successful at decision point 308 a flag may be set to "pass" at step 310. If the action was not successful a flag may be set to "fail" at step 312. After each action the terminal 10 may write the action to a calibration log at step 314. Next, the terminal 10 may check to see if the test is complete at decision point 316, if it is not the terminal 10 may prompt the technician with the next action at step 304 and the process may be repeated. If the test is complete, the terminal 10 may display the results of the test on the display 16 or return the results to the calibration management module of the terminal 10 at step 318 for further action as shown in FIG. 3.

In another embodiment of the calibration test, if a single step passes, it may not be logged. If a step fails, that failure may be logged and the technician may abort the test, retry the failed step, or skip the failed step and continue with the next step. Any step failure during the test may mean that the entire test has failed. Successfully passing the entire test may also be logged.

An exemplary action prompted by the terminal 10 at step 306 may be having the technician place a test mass in a specific location on the weighing apparatus 12. The terminal 10 may compare the resulting weight with the test mass' weight plus or minus a predetermined tolerance value. If the resulting weight is within the tolerance then the action may be passed. Another exemplary action may be running an internal diagnostics test. This may include a display or keyboard test, a serial output or digital output test, a RAM or ROM memory test, and/or printing certain pieces of information. Any number of actions may be performed and may be customized by the technician.

In one embodiment of the present invention, the calibration test may be performed before the limit has been reached. An event may occur in advance of the limit expiring to alert the technician that a limit is about to be reached, in a certain number or weighments or amount of time for example. This information may also be stored to recall at a later time. If the test is passed, the monitor would be reset without having reached the limit. This may be setup as a standard operating procedure. An exemplary event may be: displaying a message on the terminal's display 16; sending a message by email, instant message or fax to a predetermined location, deactivating the weighing apparatus 12 and/or any combination thereof.

Figure 5:
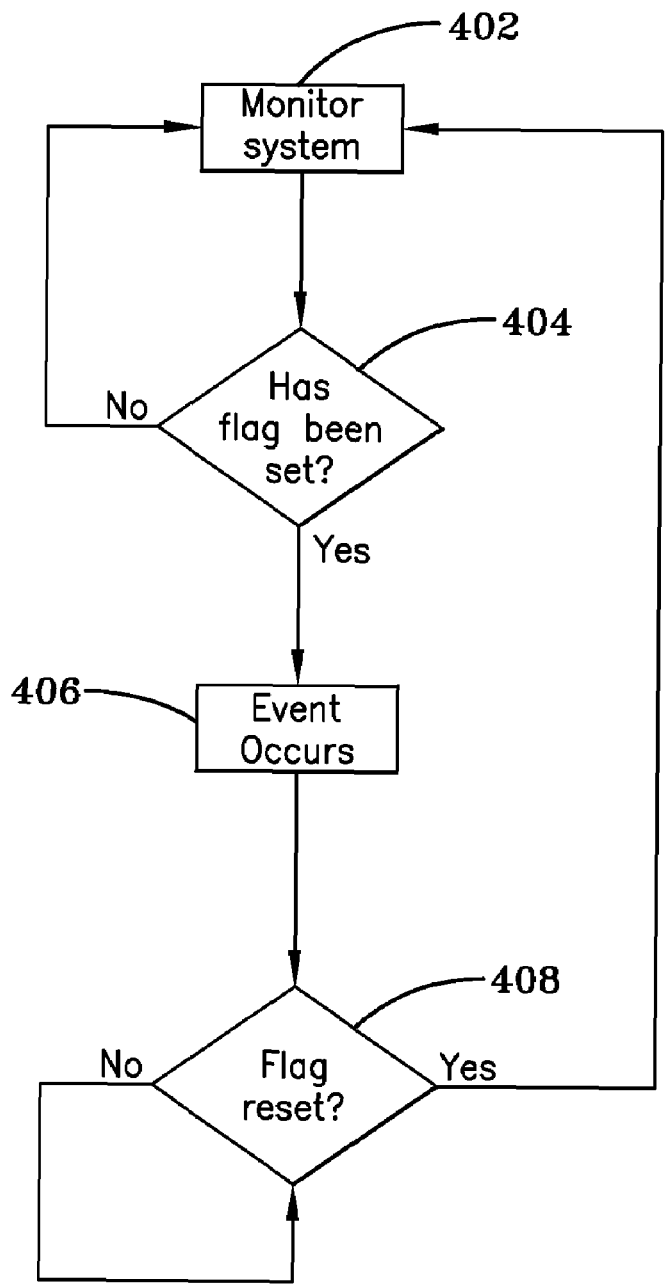
FIG. 5 shows a flow diagram of a second calibration management module of the present invention.

A second embodiment of the calibration management module of the present invention is shown in FIG. 5. Similar to the first embodiment, the terminal 10 may monitor the use of the weighing apparatus 12 at step 402 either periodically or in real time. At decision point 404, the terminal 10 may check to see if a flag has been set. The flag may indicate that the owner or lessor of the weighing apparatus 12 is delinquent in their payments or that a lease has expired. If the flag is set, then an event may occur at step 406. The event may be: displaying a message on the terminal's display 16; sending a message by email, instant message or fax to a predetermined location, deactivating the weighing apparatus 12 and/or any combination thereof. The terminal 10 may monitor the flag to see if it is reset at decision point 408. If so, then the terminal 10 may return to the normal monitoring function at step 402. This method may be used separately or in combination with the methods described above.

While certain embodiments of the present invention are described in detail above, the scope of the invention is not to be considered limited by such disclosure, and modifications are possible without departing from the spirit of the invention as evidenced by the following claims:

What is claimed is:

1. A method for automatically re-calibrating a weighing apparatus as needed, said weighing apparatus having a predetermined total weighing capacity and being electronically connected to a terminal having a display, a keyboard, a calibration management module, a calibration test module and a calibration module, said method comprising the steps of:

using said calibration management module to monitor one or more various limits associated with said weighing apparatus;

producing an event when said one or more limits has been exceeded;

performing a calibration test using said calibration test module upon the occurrence of said event;

as determined by said calibration test, producing a second event indicating that re-calibration of said weighing apparatus is necessary;

employing said calibration module to re-calibrate said weighing apparatus using a step calibration method comprising the steps of:

(a) placing a test mass having a known weight and a material having substantially the same weight as said test mass on said weighing apparatus, (b) calculating a total weight on said weighing apparatus with said terminal, (c) calibrating said weighing apparatus to said total weight with said terminal, (d) comparing said total weight to said predetermined total weighing capacity of said weighing apparatus with said terminal, and (e) removing said test mass from said weighing apparatus.

2. The method of claim 1 further comprising:

prior to step (a);

placing a test mass having a known weight on said weighing apparatus;

entering said known weight of said test mass into said terminal using said keyboard;

calibrating said weighing apparatus to said known weight of said test mass with said terminal; and removing said test mass from said weighing apparatus.

3. The method of claim 2 further comprising:

(f) repeating steps (a) through (e) until said weighing apparatus is calibrated substantially to said total weighing capacity.

4. The method of claim 1 further comprising:

(f) repeating steps (a) through (e) until said weighing apparatus is calibrated substantially to said total weighing capacity.

5. The method of claim 1 further comprising:

while said material having substantially the same weight as said test mass is being placed on said weighing apparatus, continually displaying on said display of said terminal the weight of said material.

6. The method of claim 5 wherein said material is at least one material selected from the group consisting of a liquid material and a granular material.

7. The method of claim 1 wherein said method is performed after a predetermined limit has been reached and said predetermined limit is at least one limit selected from the group consisting of a time limit, a weighment limit, an overload limit and a zero request limit.

8. The method of claim 1 wherein said method is performed after replacement of a portion of said weighing apparatus.

9. The method of claim 1 further comprising:

storing said known weight and said total weight in a memory storage device of said terminal.

* * * * *